United States Patent [19]

Klein

[11] Patent Number: 4,552,221

[45] Date of Patent: Nov. 12, 1985

[54] DRY-HEAD OR DELUGE-TYPE VALVE FOR FIRE-EXTINGUISHING SYSTEMS

[76] Inventor: Wilfried Klein, Lindlarer Str. 79, 5063 Overath-Immekeppel, Fed. Rep. of Germany

[21] Appl. No.: 517,544

[22] Filed: Jul. 27, 1983

[30] Foreign Application Priority Data

Aug. 13, 1982 [DE] Fed. Rep. of Germany ....... 3230086

[51] Int. Cl.$^4$ .............................................. A62C 37/06
[52] U.S. Cl. ....................................... 169/22; 169/17; 137/467
[58] Field of Search ....................... 169/17, 19, 20, 22; 137/467

[56] References Cited

U.S. PATENT DOCUMENTS

| | | | |
|---|---|---|---|
| 1,911,107 | 5/1933 | Carter | 169/22 |
| 3,307,633 | 3/1967 | Newall | 169/22 |
| 4,267,858 | 5/1981 | Lewis | 137/467 |

Primary Examiner—Andres Kashnikow
Assistant Examiner—James R. Moon, Jr.
Attorney, Agent, or Firm—Sprung Horn Kramer & Woods

[57] ABSTRACT

In an alarm valve for permanently installed fire-extinguishing systems, having a blocking element mounted in a valve housing with an inlet and outlet and which tightly blocks the open cross-section of the housing and locking and release mechanism integrated into the valve, the improvement wherein the locking and release mechanism comprises at least one radial depression at the open cross-section of the valve mounting, at least one locking element engageable with the at least one depression to lock the blocking element in a blocking position. The locking element is maintained in the engaged position against the pressure of an extinguishing fluid in response to the pressure of a gas or mixture of gases exceeding a predetermined level which is weaker than the pressure of the extinguishing fluid.

11 Claims, 8 Drawing Figures

DRY-HEAD OR DELUGE-TYPE VALVE FOR FIRE-EXTINGUISHING SYSTEMS

BACKGROUND OF THE INVENTION

The present invention relates to a dry-head or deluge-type alarm valve for permanently installed fire-extinguishing systems, especially sprinkler systems, with a blocking element that moves in a valve housing with an inlet and outlet and that, in the blocking position, operates in conjunction with the housing itself or with a seating ring rigidly mounted in it to tightly block the open cross-section of the housing.

Installing permanent fire-extinguishing systems, especially sprinkler systems, in large structures like department stores, industrial buildings, especially warehouses, parking garages, and similar spaces, to prevent damage from fire is known. Such systems can be wet- or dry-head. Since the piping leading to the sprinklers in wet-head systems are constantly full of water, such systems can only be employed in spaces where there is no risk of freezing. Dry-head systems, in which the section of piping leading from a source of extinguishing agent to what is called a dry-head alarm valve is full of water at a pressure of up to 10 bars, whereas the section leading from the dry-head alarm valve out into the spaces that are exposed to freezing is full of compressed air at a pressure of 3.5 bars for example, are accordingly used where there is a risk of freezing. When one or more of the sprinklers open, the air escapes and the water can set off the alarm while the valve opens and flows into the air-filled section of the piping and through the sprinklers to combat the fire.

Essentially two types of dry-head alarm valves are known, the differential type and the mechanical type. Whereas the differential type necessitates an air-blocked flap that is considerably wider than the open cross-section of the water channel, resulting in a large valve housing, the essential drawback of the mechanical type is that it is very complicated and difficult to maintain.

SUMMARY OF THE INVENTION

The present invention is intended to eliminate these drawbacks and especially as a dry-head alarm valve that allows the same type of housing to be employed as would be employed in a wet-head system.

This objective is achieved in accordance with the invention in a dry-head alarm system of the above-mentioned type, wherein at least one locking element that engages a hole, groove, or similar structure on the inside circumference of the housing or of a seating ring inserted in it, locks the blocking element in a blocking position against the pressure of an extinguishing fluid, preferably water, that acts on it as long as the pressure of a gas or mixture of gases, especially air, that acts directly or indirectly on the blocking element does not fall below a predetermined level, the locking pressure of the gas or mixture of gases being weaker, preferably considerably weaker, than the pressure of the extinguishing fluid.

The design of the dry-head or deluge-type alarm valve in accordance with the invention, in which all the parts that are important or essential to its function are accommodated in the blocking element, enables operation with one blocking element that is no wider than the clapper element of a similar wet-head alarm valve and that can accordingly be mounted in a conventional wet-head alarm housing in spite of an extinguishing-fluid pressure that is considerably more powerful than the pressure of the gas or mixture of gases. Wet-head alarm valves, dry-head alarm valves, and even deluge-type valves can accordingly be equipped with the same space-saving housing and it will only be necessary to install the specific type of blocking or clapper element needed for each type of application in the housing.

In one practical embodiment of the invention the blocking element has two disk-shaped elements rigidly fastened together, one of which functions as an air flap and at least partly engages the adjacent face of the housing or seating ring along its total circumference and the other of which functions as a water disk and is positioned inside the housing or seating ring and essentially completely spans its open cross-section when the the blocking element is in the closure position.

The air flap and water disk can also be rigidly fastened together by a central screw.

Furthermore, there can be a central, preferably cylindrical, projection on the side of the water disk that faces the air flap and a seal can be positioned in the resulting annular space between the air flap and water disk, at least partly covering the side of the housing or seating ring facing the air flap and ensuring perfect sealing in the closure or ready-to-operate state.

In another embodiment of the invention there is a central projection on the water side of the water disk and an annular joint that extends radially outward on the end of the projection. A stop gasket that is limited by the annular joint is mounted so as to move axially on this projection. The inside of the gasket is sealed tight against the projection on the water disk and its outside against the housing or seating ring. It can move axially to the extent that the water disk can block the locking element in the hole, groove, or similar structure in the housing or seating ring in one end position and hence hold the stop gasket mechanically in place against the pressure of the extinguishing water while the water disk releases the locking element, which may be for example a number of spheres or similar structures distributed, preferably uniformly, along the circumference, when the pressure of the extinguishing water that acts on the projection and annular joint becomes powerful enough as a result of the decreasing pressure of the gas or air on the other side of the flap to displace the water disk and hence the air flap as well until the annular joint comes to rest against the stop gasket. Once the locking element has been released it will be forced out of the groove by the stop gasket, which is subject to the pressure of the extinguishing water, so that the blocking element can now be displaced by the extinguishing water into its open position, opening a channel for the water to the sprinklers or other similar mechanisms.

Appropriately dimensioning the projection and annular joint on the side of the water disk that faces the extinguishing water on the one hand and the stop gasket in accordance with the existing pressure of the extinguishing water on the other is a simple means of determining the necessary level of the closing pressure of the gas or air on the air flap or, given the closure pressure of the gas and the pressure of the extinguishing water, of determining the surface ratios of the projection, including the annular joint, and stop gasket that are either necessary to close or hold the blocking element against the pressure of the extinguishing water when the gas pressure is at its highest level or that determine how great the drop in gas pressure must be to make the blocking element open automatically as desired in case of damage.

The invention also proposes providing an annular space that is positioned between the air flap and the water disk and that communicates through one or more openings in the air flap with the compressed air that acts on the flap and providing a compression spring that is positioned in an annular groove that surrounds a projection on the side of the water disk that faces the air flap and that is covered by a ring that can be displaced axially along the projection. The water disk in this case is a plate that in the ready-to-operate position completely spans and seals the open cross-section of the housing or seating ring and is mechanically locked into the ready-to-operate position by the locking element. Perfect sealing is also ensured by limiting the annular space toward the water disk with a diaphragm.

The particular advantage of this system and design is that it operates completely independent of the pressure of the extinguishing water and that it is simple to determine the necessary or practical relationships between the compressed air, the annular space, and the compression spring. Thus, for example, various gas or air pressures can be dealt with without altering the geometry of the valve simply by replacing the compression spring with one with an appropriate spring characteristic.

Instead of separate locking elements like spheres, bolts, or similar devices, that have to be kept in the locking position by additional elements and that can be lost when removed for maintenance or repair, there are also embodiments in which the same practical design of a dry-head or deluge-type alarm valve can be obtained in accordance with the invention by means of a single central locking element that spans the open cross-section of the housing or seating ring.

This can be done in accordance with the invention for example by fastening the air flap and the water disk together rigidly not with one central device but with several screws, rivets, or similar devices distributed, preferably uniformly, along the circumference and making the locking element a central conical spring element, an annular disk like a cup spring or similar device for example, that spans the cross-section of the housing or seating ring and that, in the ready-to-operate position in which it is pressed flat, extends with its outer edge or ends into the annular groove in the housing or seating ring and thus locks the water disk and with it the overall blocking element until the gas or air pressure decreases and in this case as well releases the lock so that the blocking flap opens automatically subject to the pressure of the extinguishing water. This system as well has the considerable advantages of operating completely independent of the pressure of the extinguishing water and of being adaptable to various conditions.

Some embodiments of the invention will now be described by way of example with reference to the drawings.

BRIEF DESCRIPTION OF THE DRAWINGS

FIG. 3b is a partial side view of a ridge and the water disk taken along line AB shown in FIG. 3a.

DETAILED DESCRIPTION OF THE INVENTION

Figure 1:
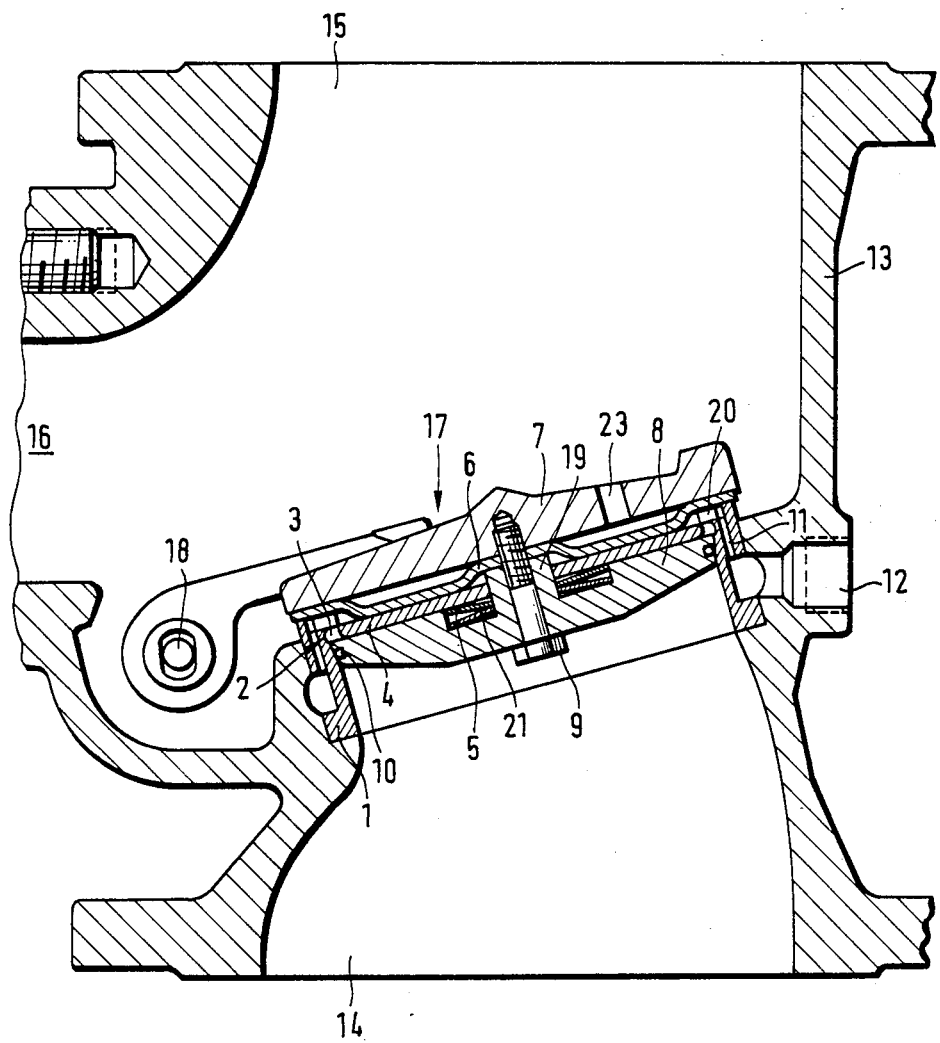
FIG. 1 is an axial section through a valve housing with a blocking flap that is controlled independent of the pressure of the extinguishing water by through an annular space charged with compressed air and by a compression spring.

Referring now to FIG. 1, a flap-seating ring 1 with an inside annular groove 2 is fastened in the housing 13 with an outlet 15, inlet 14, and handhole 16. A blocking flap 17 with an air flap 7 and a water disk 8 that is rigidly attached to it by a screw 9 pivots around a point 18 of rotation, which is located outside the channel of flow and fixed in relation to the housing. Downstream of and facing the air flap 7, water disk 8 has a central projection 19, an edge 20, and a depression 21 that surrounds the projection. A diaphragm 6 is positioned between air flap 7 and flap-seating ring 1 and between the edge 20 of and the projection 19 on water disk 8. The part of the water disk that acts as a closure plate 4 is mounted on projection 19, covering depression 21 and cup compression spring 5, and can be axially displaced from it.

The valve, which is illustrated ready to operate, communicates through inlet 14 and through piping that is not illustrated with a source, also not illustrated, of extinguishing agent and through outlet 15 and piping that is not illustrated to a sprinkler system or similar system, not illustrated. Handhole 16 is covered with a lid that is also not illustrated. The space above, blocking flap 17 is full of compressed air that presses not only against air flap 7 but also through one or more perforations 23 in the air flap and through diaphragm 6 against closure plate 4. Closure plate 4 is accordingly pressed against the force of cup compression spring 5 against water disk 8, retaining the spherical locking elements 3 distributed along the circumference in the perforations 22 (FIG. 1a) in the edge 20 of the water disk or in the annular groove 2 in flap-seating ring 1. Water disk 8 is therefore locked to flap-seating ring 1 and can resist the pressure below the water disk, with the seal 10 on the circumference of water disk 8 preventing the extinguishing water from penetrating.

When one (or more) sprinklers open, air will escape through it from the piping network that communicates with the outlet 15 of valve housing 13 and hence out of the upper part of the valve as well. When the air pressure has dropped to a specific level the force of cup compression springs 5 will be powerful enough to lift closure plate 4 from projection 19. The system is designed so that closure plate 4 will be lifted at least high enough to completely free spherical locking elements 3, which will be forced out of annular groove 2 and on into perforations 22. This releases the lock and the pressure of the extinguishing water can now pivot blocking flap 17 out of flap-seating ring 1 around point 18 of rotation. The extinguishing water will now flow through the piping network, not illustrated, to the sprinklers and through the annular gap 11 or similar structure and alarm connection 12 to an alarm, which is not illustrated.

Figure 1A:
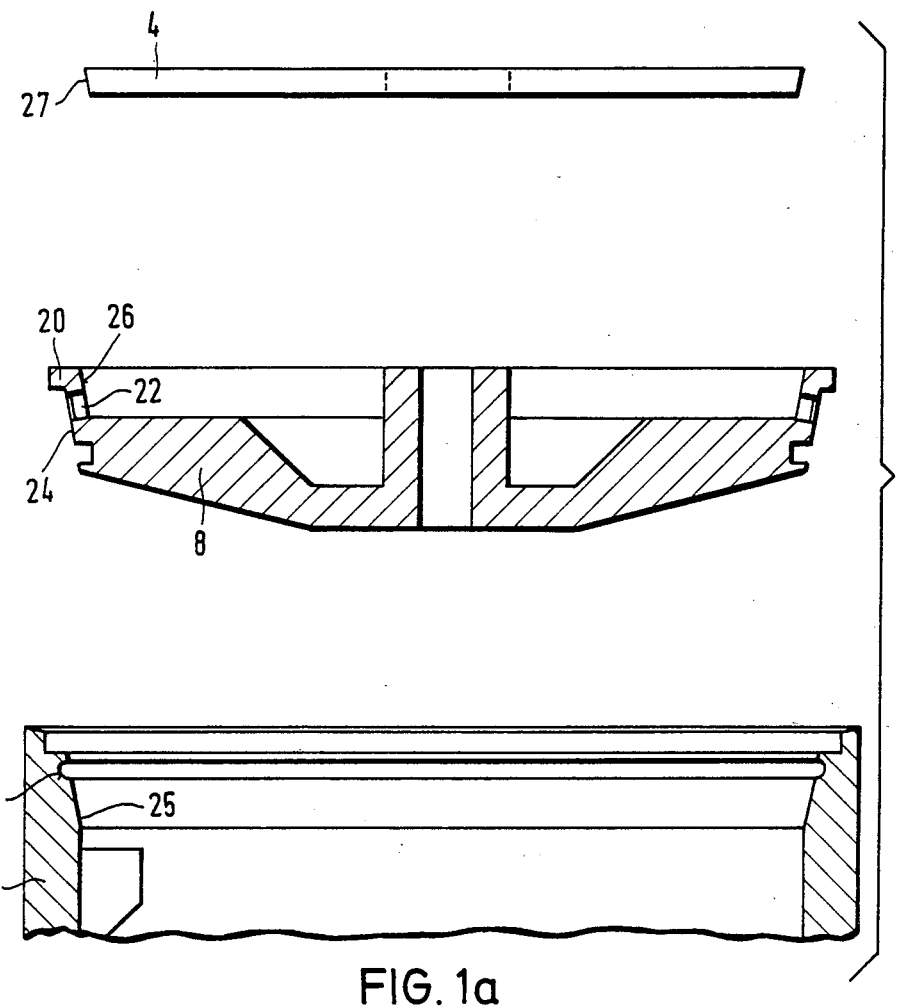
FIG. 1a is a section in a slightly larger scale through a disassembled and slightly different embodiment, illustrating the water disk, its associated closure plate, and some of the flap-seating ring.

As will be evident from FIG. 1a, the conical outside surface 24 of water disk 8 and the conical inside surface 25 of flap-seating ring 1 as well as the conical inside surface 26 of water disk 8 and the conical outside surface 27 of blocking plate 4 fit together precisely and the annular groove 2 in flap-seating ring 1 is just deep enough for spherical locking elements 3 to be reliably and entirely forced by the pressure of the extinguishing water out of annular groove 2 and on into perforations 22 on the circumference of the water disk once they have been freed when water disk 8 lifts closure plate 4, ensuring that the blocking flap will pivot freely.

Figure 2:
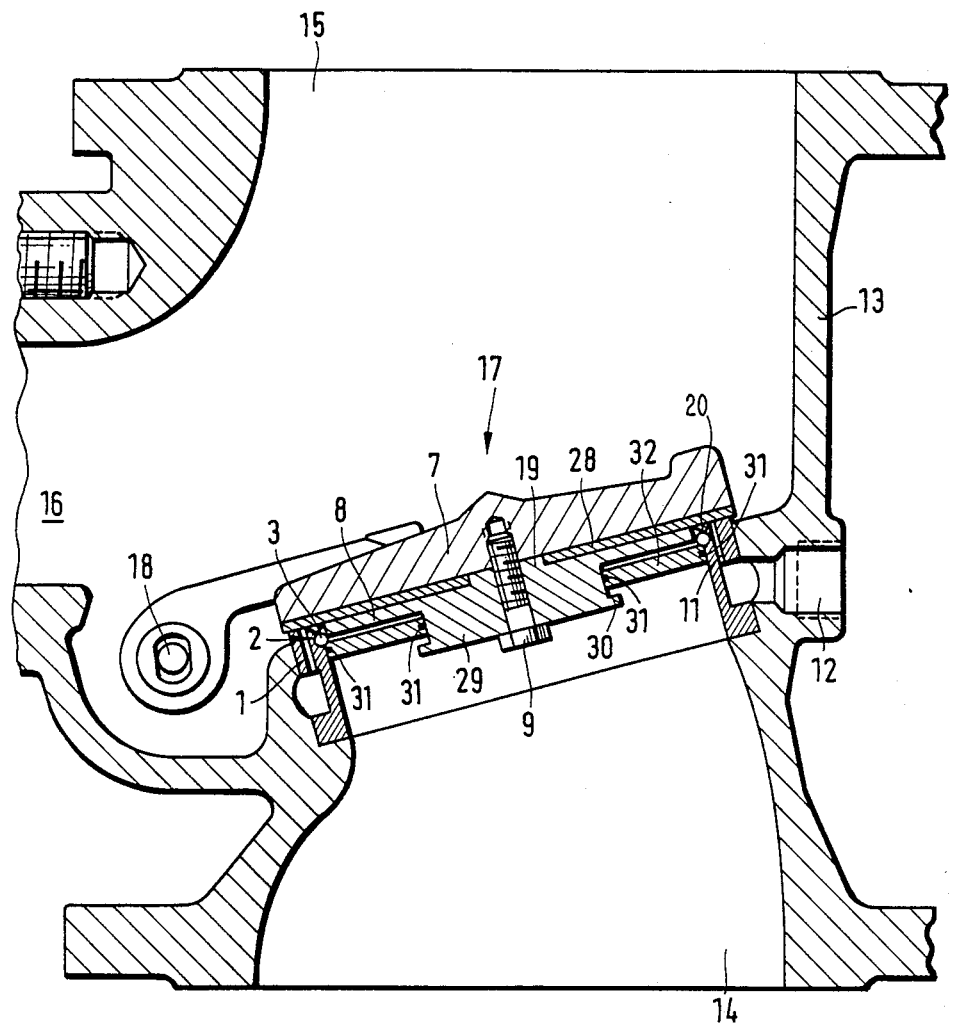
FIG. 2 is another axial section of a blocking flap that is controlled in accordance with gas or water pressure and with the pressure of the extinguishing water.

In the embodiment in FIG. 2, air flap 7 and water disk 8 are again rigidly fastened together with a central screw 9. This water disk 8 also has a projection 19 on the side facing the air flap. There is a seal 28 in the resulting annular gap between air flap 7 and water disk 8. The side of water disk 8 that faces the extinguishing water has a central projection 29 with an annular joint 30 at the end. There is a stop gasket 32 equipped on the outside and inside with seals 31 on projection 29.

The valve, which again communicates on the air-flap side with a source of compressed air and on the water side with a source of extinguishing agent is also illustrated ready to operate. Here again the air pressure that acts on air flap 7 is weaker than the water pressure that acts on water disk 8. Since, however, only the face of projection 29 with joint 30 participates in keeping blocking flap 17 closed or opening it because the force applied to stop gasket 32 as the result of the mechanical locking action of spherical locking elements 3 and water disk 8 is neutralized, whereas the face of projection 19 is considerably smaller than the surface of air flap 7, the force tending to close the blocking flap will prevail. Only when the pressure on the side facing the air flap drops to a certain level subsequent to the opening of one or more sprinklers will the force acting on projection 19 prevail and displace water disk 8 or pivot blocking flap 17 in the opening direction. Spherical locking elements 3 will then be released so that they can leave annular groove 2 and free stop gasket 32, which will pivot subject to the force of the extinguishing water and be entrained by annular joint 30 with the other parts of the blocking flap into the open position, opening a channel for the extinguishing water so that the alarm, not illustrated, will be set off through annular gap 11 and alarm connection 12.

Figure 3:
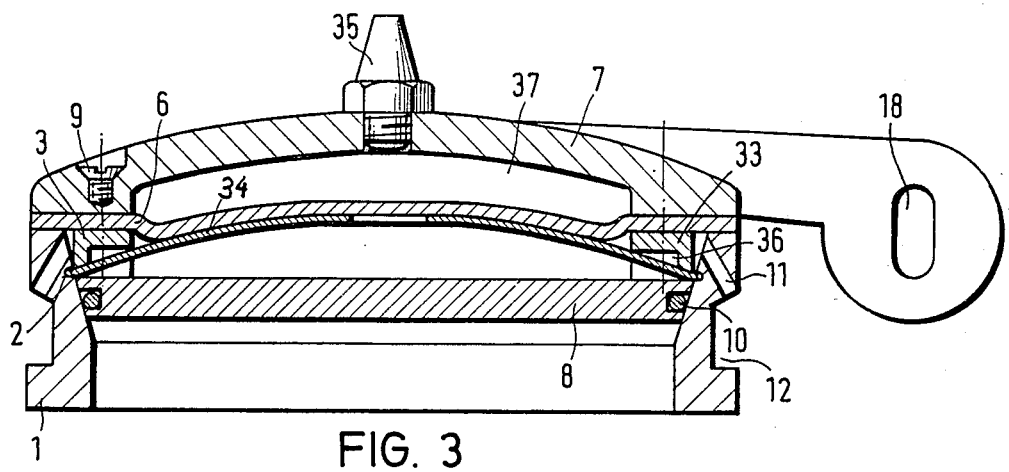
FIG. 3 is an axial section through a flap-seating ring with a central locking element controlled independent of the pressure of the extinguishing water.
Figure 3B:
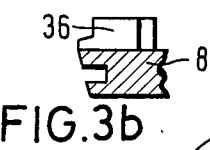
Figure 3A:
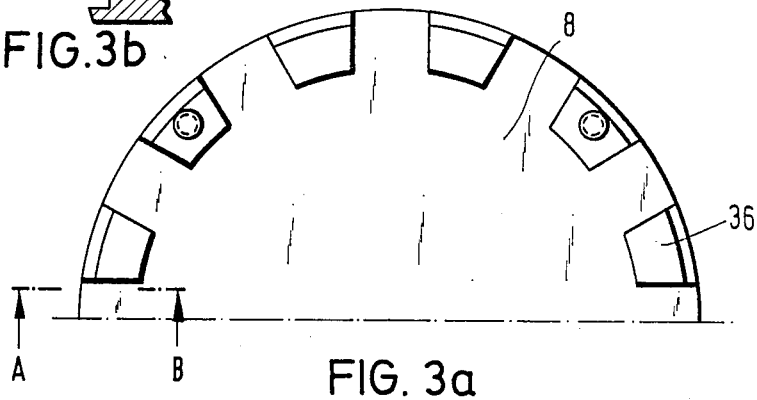
FIG. 3a is a partial top view of the water disk in FIG. 3.
Figure 3C:
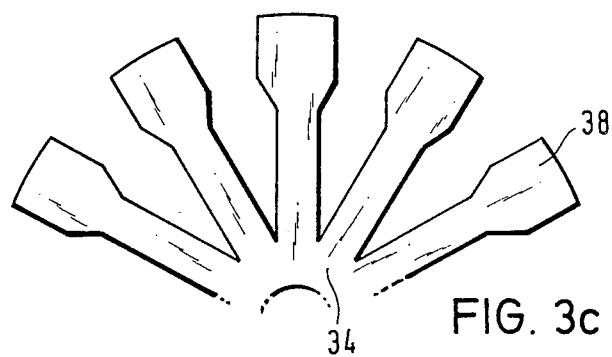
FIG. 3c is a top view of one embodiment of the locking elememt in FIG. 3.

In the embodiment illustrated in FIG. 3, air flap 7 and water disk 8 are rigidly fastened together by screws 9 distributed uniformly along the circumference. Between air flap 7 and water disk 8, diaphragm 6 is positioned by means of a membrane-securing gasket 33 supported, as will be evident from FIGS. 3a and 3b, on ridges 36 distributed uniformly along the circumference of water disk 8. Between diaphragm 6 and water disk 8, the star-shaped spring element 34, illustrated in FIG. 3c, is mounted in groove 2 of ring 1. Air flap 7 has a centrally positioned filter stuffing 35 of sintered metal and flap-seating ring 1 has an annular gap 11 and alarm connection 12.

The blocking flap is illustrated before the initiation of operation. When operation is initiated, the piping network, not illustrated, above air flap 7 is filled with compressed air, which rushes through filter stuffing 35 into a space 37 above diaphragm 6. The pressure of the air causes diaphragm 6 to force star-shaped spring element 34 down until it rests flat against water disk 8, with ends 38 (FIG. 3c) sliding into the annular groove 2 in the flap-seating ring, mechanically locking water disk 8 to flap-seating ring 1. Since the pressure of the extinguishing water can now be applied below the water disk 8, which is sealed off from flap-seating ring 1 by seal 10, the valve is now ready to operate.

When one or more sprinklers opens, the air pressure above the membrane will drop. Spring element 34 will buckle upward and ends 38 will lift out of annular groove 2, releasing the lock so that the pressure of the extinguishing water will open the blocking flap and the water will flow into the sprinkler piping network and through annular gap 11 and alarm connection 12 to an alarm that is not illustrated.

If the valve is intended to open rapidly, a source of compressed air can be connected to alarm connection 12. When the compressed air flows in through annular gap 11 under diaphragm 6 its closing force will be canceled and the valve will open. It is also of course possible to design the embodiments in FIGS. 1 and 2 to open rapdily.

Figure 4:
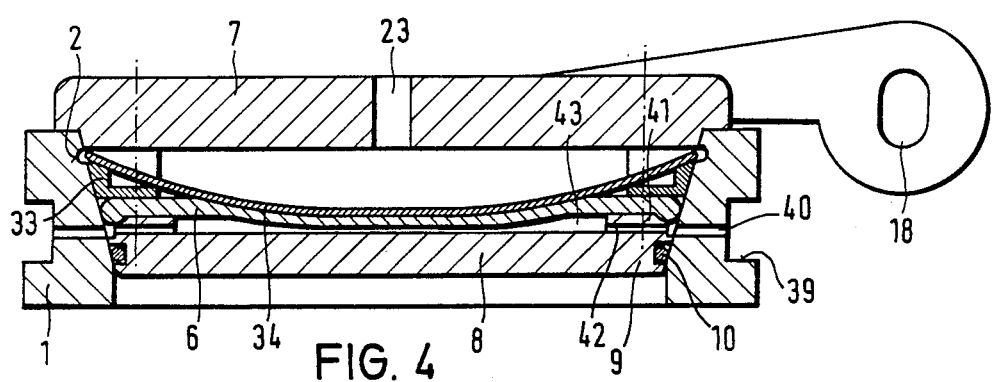
FIG. 4 is an axial section through one embodiment of a flap for blocking a deluge valve.

The blocking valve with a flap-seating ring illustrated in FIG. 4 is an embodiment of the type employed with deluge valves for water-spraying extinguishing systems. In this case, the extinguishing agent is present up to the spray valve, behind which the piping network is supplied with open extinguishing nozzles and filled with atmospheric air when ready to operate.

The instant at which the blocking flap has just been released but not yet subjected to pressure by the extinguishing agent is illustrated. Diaphragm 6 is mounted above water disk 8 with seal 10 and spring element 34, which may also be star-shaped for example, is mounted above diaphragm 6. The air pressure above air flap 7 and above perforation 23 in the space below the flap but above diaphragm 6 is atmospheric. Flap-seating ring 1 and annular groove 39 are provided with perforations 40, and the elevated edge 41 of water disk 8 with perforations 42 for the supply of controlling air to the space 43 between water disk 8 and diaphragm 6. In the locked state, spring element 34 is pressed flat by the air pressure acting against the membrane, with the ends of spring element 34 engaging annular groove 2 and locking the blocking flap.

Water-spraying extinguishing systems are employed where a whole section must be supplied with water simultaneously through the open nozzles. The section may have an initiating network filled with compressed air or water. There are initiators (sprinklers) in the initiating network. When one or more of these initiators opens, the pressure in the initiator network, and hence in the control-air connection and in space 43, drops. Spring element 34, which is compressed flat and under tension, is accordingly released and can assume the position illustrated in FIG. 4, with its ends slipping out of annular groove 2 and releasing the mechanical lock. The water pressure on water disk 8 can now open the blocking flap and release the channel of flow into the piping network with the open nozzles.

Fire-extinguishing valves are preferably mounted vertically as illustrated in the drawings, although horizontal systems and even corner valves are also known. The design in accordance with the invention may of course also be employed to the same advantage with these systems. It is preferable for the valves to have a circular cross-section, although it is also conceivable to employ the invention with valves that have a cross-section that is, say, elliptical or another shape.

The blocking elements in this context need not of course be restricted to the blocking flaps that pivot around a fixed point on the housing outside the channel of flow as illustrated in the drawings but may for example rotate or pivot around a point within the channel of flow or be lifted off a seat. It is also within the scope of the invention for the blocking element to consist of two or more rotating or pivoting or even parallel and simultaneously lifting parts that block off the cross-section of the housing instead of a single part that blocks off the whole cross-section.

The spherical and star-shaped embodiments of the locking elements illustrated herein are only examples and other forms like short cylindrical pins with ends rounded off into a ball or cup springs with bent-in edges are of course also possible. Similarly, the locking force can also be generated or transmitted by means other than a diaphragm, like a piston and cylinder for example. Finally, it is obvious that materials that are appropriate to the function of its individual parts and that will in particular ensure long-term life and reliable operation will be employed for the valve.

It will be appreciated that the instant specification and claims are set forth by way of illustration and not limitation, and that various modifications and changes may be made without departing from the spirit and scope of the present invention.

What is claimed is:

1. In a dry or deluge-type valve for permanently installed fire-extinguishing systems, having a blocking element mounted in a valve housing with an inlet and outlet and which tightly blocks the open cross-section of the housing and locking and release means integrated into the valve, the improvement wherein the locking and release means comprises means forming at least one radial depression at the open cross-section of the valve mounting, at least one locking element engageable with the at least one depression to lock the blocking element in a blocking position and means for maintaining the locking element in the engaged position against the pressure of an extinguishing fluid in response to the pressure of a gas or mixture of gases exceeding a predetermined level which is weaker than the pressure of the extinguishing fluid, wherein the blocking element comprises two disk-shaped elements rigidly fastened together, one of which is an air flap configured to at least partly engage an adjacent face of the open cross-section of the housing along its total circumference and the other of which is a water disk configured to be positioned inside the open cross-section housing and completely span same when the blocking element is in the blocking position, wherein one part of the water disk has a central projection and an annular depression that surrounds the projection on the side that faces the air flap, a closure plate mounted for axial displacement on the central projection and a compression spring in the annular depression, and wherein the central projection and the edge of the open cross-section of the housing, the closure plate and the air flap form an annular space and wherein the annular space communicates with the part of the housing that faces the air flap through at least one hole in the air flap.

2. The valve as in claim 1, wherein the air flap and water disk are rigidly fastened together by a central screw.

3. The valve as in claim 1, wherein a seal with exterior contours that at least approximately match those of the air flap is positioned in and fills the resulting annular space.

4. The valve as in claim 1, wherein the water disk is axially displaceable between two end positions relative to the air flap, the end of the central projection is limited by an annular joint that extends along its circumference and projects outwardly, and wherein a stop gasket that is sealed tight along its inside circumference against the projection and along its outside circumference against the open cross-section of the housing is positioned on the projection for axial displacement, with the central projection extending axially to the extent that, when the water disk is in one end position, it locks the blocking element in position and, when it is in the other end position, it frees it.

5. The valve as in claim 1, further comprising a diaphragm that essentially matches the flat dimensions of the air flap, positioned between the air flap and the water disk in the annular space.

6. The valve as in claim 1, comprising a plurality of locking elements each comprising a sphere.

7. The valve as in claim 1, wherein the air flap and water disk are rigidly fastened together by several elements along the circumference thereof.

8. The valve as in claim 1, wherein the inside of the housing communicates with an alarm through at 9. In a dry or deluge-type valve for permanently installed fire-extinguishing systems, having a blocking element mounted in a valve housing with an inlet and outlet and which tightly blocks the open cross-section of the housing and locking and release means integrated into the valve, the improvement wherein the locking and release means comprises means forming at least one radial depression at the open cross-section of the valve mounting, at least one locking element engageable with the at least one depression to lock the blocking element in a blocking position and means for maintaining the locking element in the engaged position against the pressure of an extinguishing fluid in response to the pressure of a gas or mixture of gases exceeding a predetermined level which is weaker than the pressure of the extinguishing fluid, wherein the blocking element comprises two disk-shaped elements rigidly fastened together by several elements along the circumference thereof, one of which is an air flap configured to at least partly engage an adjacent face of the open cross-section of the housing along its total circumference and the other of which is a water disk configured to be positioned inside the open cross-section housing and completely span same when the blocking element is in the blocking position and wherein the locking element comprises a central conical spring element between the air flap and water disk and configured to not engage the radial depression when it is in the unloaded state and to engage same in the housing or seating ring along its circumference when it is in the loaded state and is pressed flat.

10. The valve as in claim 9, wherein the spring element comprises a star-shaped slotted disk.

11. The valve as in claim 9, further comprising a diaphragm spanning the open cross-section of the housing and fastened between the air flap and the water disk by axial projections along the circumference of the open cross-section of the housing, and a sealing and securing gasket resting on the projectors on the side of the locking element that faces the air flap and wherein the space between the diaphragm and the water disk communicates with a source of compressed gas, and the space between the diaphragm and the air flap element communicates with the atmosphere.

* * * * *

UNITED STATES PATENT AND TRADEMARK OFFICE
CERTIFICATE OF CORRECTION

PATENT NO. : 4,552,221
DATED : November 12, 1985
INVENTOR(S) : Wilfried Klein

It is certified that error appears in the above-identified patent and that said Letters Patent is hereby corrected as shown below:

Col. 8, line 25, After "at" insert --least one passage in the housing that is blocked by the blocking element when it is in the blocking position.--

Signed and Sealed this

First Day of April 1986

[SEAL]

Attest:

Attesting Officer

DONALD J. QUIGG

Commissioner of Patents and Trademarks